United States Patent [19]

Akhtar-Khavari et al.

[11] 4,413,388
[45] Nov. 8, 1983

[54] PIPE REPAIR CLAMP

[75] Inventors: Fuad Akhtar-Khavari; Bernard J. Lobin, both of Texarkana, Tex.

[73] Assignee: Rockwell International Corporation, Pittsburgh, Pa.

[21] Appl. No.: 260,226

[22] Filed: May 4, 1981

[51] Int. Cl.³ .................. B65D 63/02; F16I 55/16
[52] U.S. Cl. .................. 24/279; 285/373; 138/99
[58] Field of Search .......... 24/279, 284, 285; 285/373; 138/99

[56] References Cited

U.S. PATENT DOCUMENTS

| | | | |
|---|---|---|---|
| 2,897,568 | 8/1959 | Hoke | 24/279 |
| 3,110,948 | 11/1963 | Voss | 24/279 |
| 3,189,970 | 6/1965 | Barr | 24/284 |
| 3,195,205 | 7/1965 | Morriss, Jr. et al. | 24/279 |
| 3,254,387 | 6/1966 | Smith | 24/279 |
| 3,680,180 | 8/1972 | Gould et al. | 24/279 |
| 3,889,324 | 6/1975 | Glover | 24/279 |

FOREIGN PATENT DOCUMENTS 9632 of 1906 United Kingdom ............ 24/271

Primary Examiner—John J. Wilson

[57] ABSTRACT

A pipe clamp is comprised of opposed lugs having base portions. The base portions have axially extending recesses and an axially extending slot of lesser radial dimension than the radial dimension of the recess extends from the inner edges of the bases to the recess to form jaws in each base. The free ends of a flexible band are tightly folded back to form enlarged end portions on the ends of the band, the enlarged end portion and adjacent portion of the band being insertable axially into the recess and slot respectively.

4 Claims, 5 Drawing Figures

PIPE REPAIR CLAMP

BACKGROUND OF THE INVENTION

This invention relates to repair clamps for pipes which are adapted to encircle the ends of two pipes which are to be joined together or to encircle a pipe which has been damaged and thereby prevent leakage between the ends of the pipes or from the damaged portion of the pipe. Essentially such clamps are comprised of two or more opposed lugs and a flexible, usually metallic, band the ends of which are secured respectively into each of the lugs. As bolts connecting the lugs are tightened, the lugs are brought together to tighten the band around the damaged area of the pipe or around the ends of the pipe to be joined. A gasket of a suitable sealing material, such as an elastomer, is compressed between the flexible metallic band and the pipe to insure leak-type engagement between the clamp and the of the pipe or the ends of the pipe to be joined.

This invention is concerned with the means for securing the ends of the bands to the opposed lugs. One of the problems that must be overcome in designing a suitable pipe repair clamp is the tendency of the ends of the flexible band where they are secured to the lugs to pull loose from the lugs as the bolts connecting the lugs are tightened to apply tension to the band. The prior art is replete with many different proposed solutions to this problem, typical of which are shown in the following U.S. patents: Stauffer U.S. Pat. No. 2,278,714; Schustack U.S. Pat. No. 2,713,352; Schustack U.S. Pat. No. 2,826,799; Dahl U.S. Pat. No. 2,835,954; Hoke U.S. Pat. No. 2,897,568; Smith U.S. Pat. No. 2,998,629; Graham et al U.S. Pat. No. 3,089,212; Graham et al U.S. Pat. No. 3,175,267; Barr U.S. Pat. No. 3,189,970; Faint U.S. Pat. No. 3,204,665; Smith U.S. Pat. No. 3,254,387; Smith U.S. Pat. No. 3,584,353;

Many of the solutions proposed by the prior art while providing a strong band-to-lug connection, are complicated and therefore difficult and expensive to produce and assemble; others simply do not provide the requisite strength and still others require assembly operations which may weaken the lug during production of the clamp. For example, it is conventional practice to form the lugs with jaws which initially diverge from each other. During assembly of the clamp, the ends of the bands are inserted between the diverging jaws and the jaws are then coined shut against the end of the band. Protrustions may be formed on one jaw which are received into recesses formed on the other jaw to provide a strong connection between the lug and the band. Examples of such practice are shown in the patents to Graham et al. U.S. Pat. No. 3,089,212, Graham et al. U.S. Pat. No. 3,175,267, and Smith U.S. Pat. Nos. 3,254,387, 3,584,353. While the arrangement shown in these last mentioned patents may provide a strong connection between the band ends and the lug, frequently the base of the lug is weakened by the coining operation and often cracks will appear along the line of the base of the lug which defines the point about which the lower jaw is bent, thus weakening the lug.

The patent to Hoke, U.S. Pat. No. 2,897,568 shows the ends of a band which are partially wrapped around a wire and fingers on the upper portion of the bases which are coined or bent around the end of the band and the wires to secure the ends of the band onto the bases of the lugs. These fingers are, of course, subject to the same problems of reduced strength as the prior art arrangements disclosed in the patents immediately above discussed, only more so since a number of spaced fingers are employed rather than a continuous axially extending jaw. Throughout this specification and the appended claims, the terms "axial" or "axially" refers to a direction parallel to the axis of the pipe on which the clamp is mounted, and the terms "radial" or "radially" refers to a direction which is radial of the axis of the pipe on which the clamp is mounted.

Applicants have found that a suitably strong connection between the ends of the bands and the lugs may be achieved by providing an axially extending recess in the base of the lug with a slot of a radial dimension to accommodate the thickness of the band extending from the inner edge of the base to the recess, the recess having a radial dimension greater than the radial dimension of the slot. The end of the band is tightly folded back on itself one or more times, or otherwise enlarged as by welding additional metal thereto to provide an enlarged portion adapted to be received into the recess. The enlarged portion of the band end and the adjacent portion of the band may then be axially inserted into the recess and the slot respectively from either end of the lug, no coining of the jaws formed by the slot and recess being necessary. The above-mentioned patent to Barr, U.S. Pat. No. 3,189,970, in FIG. 11 shows an axially extending recess in the base of a lug and a slot which communicates with the recess. The ends of the band are folded back and are received in the recess. However, successive layers of the folded back end portions are spaced from each other and therefore the end portions do not present an essentially continuous or solid cross section. Under relatively low tensile stress in the band, as the nuts are tightened the band end portions of Barr could be unrolled and pulled through the slot. In applicants' arrangement, the enlarged band ends present an essentially solid cross section whether folded back or otherwise enlarged. Moreover, when the end of the band is tightly folded back to form an enlarged portion having a substantially solid cross section, the band material becomes cold worked in the area of the fold which increases the strength of the material or spot welding the folds to further increase the strength of retention. For these reasons it would be extremely difficult to apply sufficient tensile stress to the band to "unroll" the tight fold of applicants' band ends.

Furthermore, in Barr's arrangement, the radial dimension of the recess extends from the top surface of the slot radially inwardly toward the axis of the pipe so that the enlarged portion of the recess extends from the slot inwardly toward the axis of the pipe. Applicants have discovered that by forming the recess so that its radial dimension extends radially outward from the slot, use of the lug base material in both the upper and lower jaws is optimized and that the pull-out forces on the band must exceed the energy expanded to forming the folds in order to break applicants' band-to-lug connection; thus a significant increase in the strength of the band-to-lug connection is achieved over that provided by a recess which extends radially inward from the slot.

DESCRIPTION OF THE DRAWINGS

FIG. 4-B is an enlarged cross-section of a lug base in which the radial dimension of the band receiving recess extends in the opposite direction from that shown in FIG. 4-A.

DETAILED DESCRIPTION OF THE INVENTION

Figure 2:
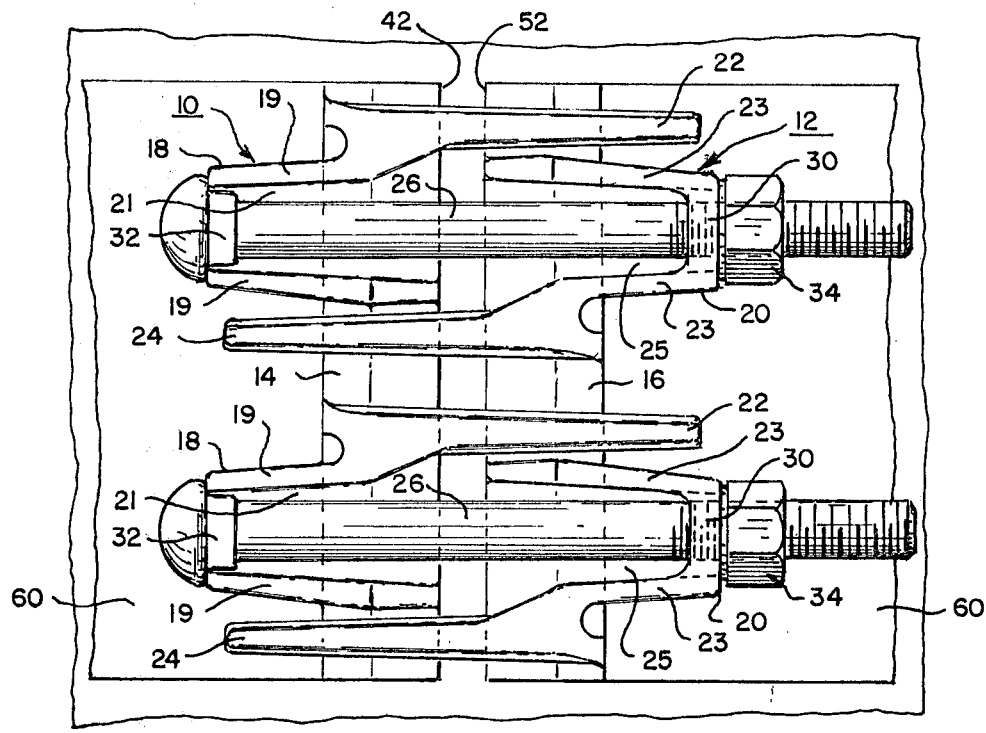
FIG. 2 is a top plan view of the clamp arrangement shown in FIG. 1.

As shown in the drawings, applicant's clamp employs opposed lugs 10 and 12 having axially extending bases 14 and 16 respectively. Integrally formed on or welded to the top surfaces of the bases 14 and 16 are respective bolt capturing bosses 18 and 20. Axially spaced fingers 22 are also integrally formed on the top surface of base 14 which project beyond the inner edge 42 of base 14. Similarly, axially spaced fingers 24 are formed on base 16 which project beyond the inner edge 52 of base 16.

The bosses 18 are comprised of spaced walls 19 forming channels 21 for the reception of the shank of the head ends of bolts 26. Similarly, the bosses 18 on lug 12 are comprised of spaced walls 23 forming channels 25 for the reception of the threaded ends of the bolts. Thus, in the assembled clamp, the channels 21 are aligned with channels 25 to provide means for capturing the bolts. The walls 23 of the bosses 20 are closed by bridge portions 30 while the tops of the bosses 18 are open for the easy reception of the head-ends of the bolts 26. Adjacent their heads the bolts are provided with flat or oval shaped portions 32 which are snugly received between the walls of the bosses 18. The opposite ends of the bolts are threaded and extend through the bridge portion 30. Nuts 34 are threaded onto the threaded ends of the bolts to thereby draw the lugs 10 and 12 together to exert the desired degree of tension in the band. It will be appreciated that the flat or oval portions 32 of the bolts 26 being snugly received within channels 21 will prevent rotation of the bolts as the nuts 34 are tightened, thereby facilitating tightening of the clamp with only one wrench.

Figure 1:
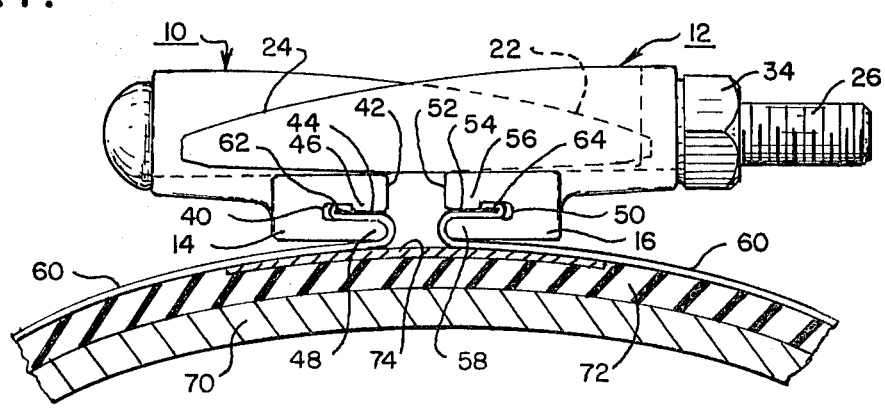
FIG. 1 shows a side elevation of the lugs and a portion of the band of a clamp employing applicants' invention.

As can be seen from FIGS. 1 and 2 the fingers 22 extending from base 14 overlie the base 16 and the fingers 24 extending from the base 16 overlie the base 14 in the clamp assembly. The function and operation of these fingers will be described hereinbelow.

Figure 3:
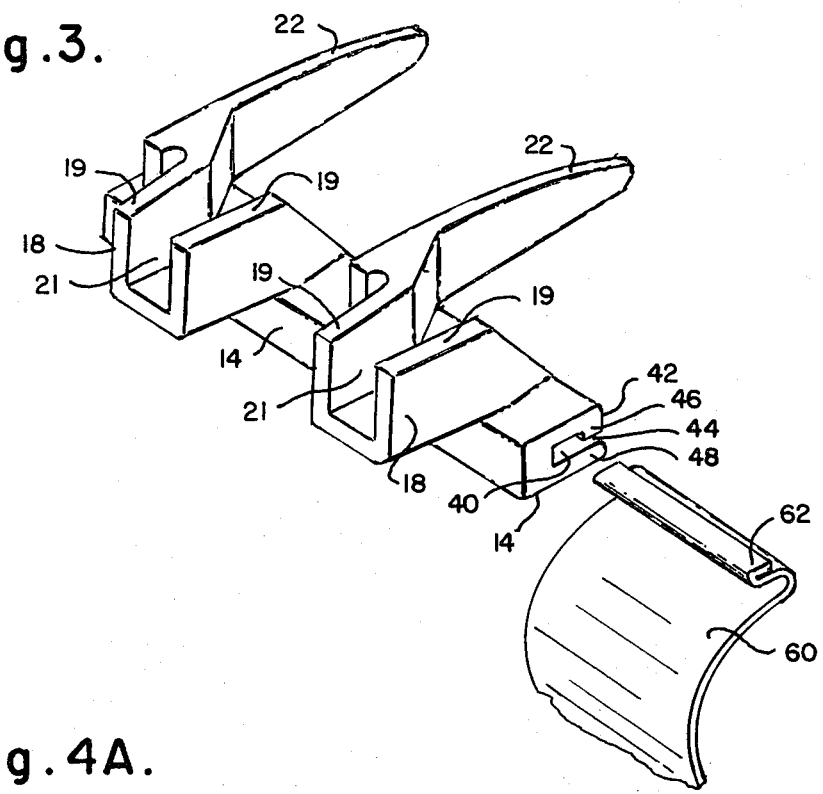
FIG. 3 is a perspective view showing the disassembled relationship between one end of the band and one of the lugs of this invention prior to assembly of the band onto the lug.

As best shown in FIGS. 1 and 3, an axially extending recess 40 is formed in the base 14 at a point spaced from the inner edge 42 of the base. An axially extending slot 44 extends from the inner edge 42 of the base of the recess 40 to form jaws 46 and 48, the radially inward surface of the slot being an extension or continuation of the radially inward surface of the recess 40 and the radial dimension of the recess 40 being larger than the radial dimension of the slot 44. Thus, the recess provides an enclosed space which is larger than the slot 44 and extends radially away from the slot 44. Similarly, base 16 is formed with an axially extending recess 50. An axially extending slot 54 extends from the inner edge 52 of the base 16 to the recess 50 to form jaws 56 and 58. The relationship between the slot 54 and recess 50 is the same as that which exists between slot 44 and recess 40.

Figure 4A:
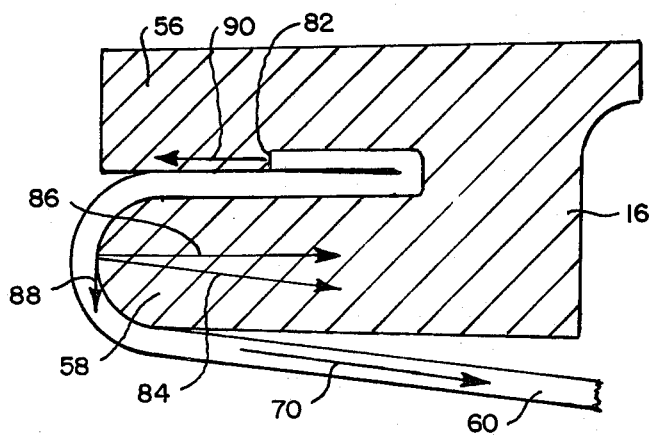
FIG. 4-A is an enlarged cross-section of the lug base showing the forces and moments existing in the lug base of applicants' invention.

The free ends of a flexible metallic band 60 are folded back to provide enlarged portions 62 and 64 having a radial dimension larger than the radial dimension of the slots 44 and 54 and which are snugly received within recesses 40 and 50 respectively and to provide abutment edges 82 (see FIG. 4A). As can best be seen from FIG. 3, the enlarged portions 62 and 64 and the adjacent portions of the band 60 may be axially inserted into the recesses 40 and 50 and the slots 44 and 54 from either end of the bases 14 and 16. When so assembled, the enlarged portions of the bands being nested within the respective recesses 40 and 50 provided a particularly strong connection with the lugs, especially when the clamp has been tightened on a pipe as will as explained below. The tight fold on the ends of the band 60 provides substantial area contact between the surfaces of the folded over portion and great resistance to the tendency for the ends of the band to "unroll" when the band is under stress. If desired, the resistance to the tendency to "unroll" may be increased by welding the layers of the end portion of the band 60 together. In order to prevent inadvertent disassembly of the bands from the lug, the end surfaces of the bases 14 and 16 may be deformed into the area of the recesses 40 and 50 and slots 44 and 54. Other means of retaining the band ends in the recesses are by welding, glue, etc. A gasket 72 is interposed between the steel band 60 and the surface of pipe 70.

To mount the clamp on the pipe, the nuts 34 are loosened sufficiently to facilitate easy disengagement of the heads of the bolts 26 from the bosses 18, thus disconnecting one lug from the other. The band is then expanded sufficiently to allow the band and the gasket to encircle the desired area of the pipe and the lugs are then manually urged together to the point where the head portion of the bolts may again be reseated in bosses 18. As shown in FIGS. 1 and 2, the fingers 22 of lug 10 overlie the base 16 of the lug 12 and the fingers 24 overlie the base 14 of the lug 10. As the nuts 34 are tightened, the lugs are brought together to the point where the band 60 exerts sufficient radial pressure on the encircled gasket 72 to prevent leakage from the damaged portion of the pipe or the ends of the pipe being joined. As best seen in FIG. 1, as the nuts 34 are tightened, the bolts 26 exert a clockwise moment on the lug 10. Since the fingers 22 overlie the base 16 of the opposing lug 12, this clockwise moment is absorbed by the base 16. Similarly, the bolts 26 exert a counterclockwise moment on lug 12 which moment is absorbed by the base 14 through the fingers 24. It can be seen, therefore, that the moments imparted to the lugs by the tightening action of the nuts and bolts are absorbed by the base of the opposite lug which not only prevents rotation of the lugs but also imposes a radial thrust on both the jaws 46 and 48 and jaws 56 and 59 to enhance the clamping action on the ends of the bands 60, the magnitude of which action depends on the contact area between the fingers 22 and 24 and the radially outward surface of jaws 46 and 56.

As the nuts 34 are tightened down, the band 60 is placed in tension but because the enlarged portions 62 and 64 are nested snugly in the recesses 40 and 50, the ends of the bands are prevented from being pulled out of the recesses through their associated slots. Enlargement of the slots by speading of the jaws is resisted by the action of the radial thrust imposed on the bases by the fingers 22 and 24 as explained above, as well as the section modulus of both jaws.

A steel bridge plate 74 is interposed between the gasket 72 and the band 60 bridging the open spaced between the bases 14 and 16 which prevents deformation of the gasket into the open space and ensures a uniform sealing pressure on the gasket as the nuts 34 are tightened down.

Applicants have found that the slot, recess and enlarged cold worked band end portions above described provides an inexpensive band-to-lug connection of extraordinary strength and one which may be assembled without the necessity of forming the jaws in an open position and coining them shut during the assembly operation. Applicants have also found that it is important that the axially extending recesses in the lug bases extend radially outwardly from the slots rather than radially inwardly from the slot as shown in the aforementioned patent to Barr. Tests and computer models of both arrangements have shown that the lower jaw of a lug base with the radially outwardly extending recess has 37% less shear stress than the lower jaw of a base in which the recess extends radially inward, thus producing a significantly stronger band-to-lug connection.

Figure 4B:
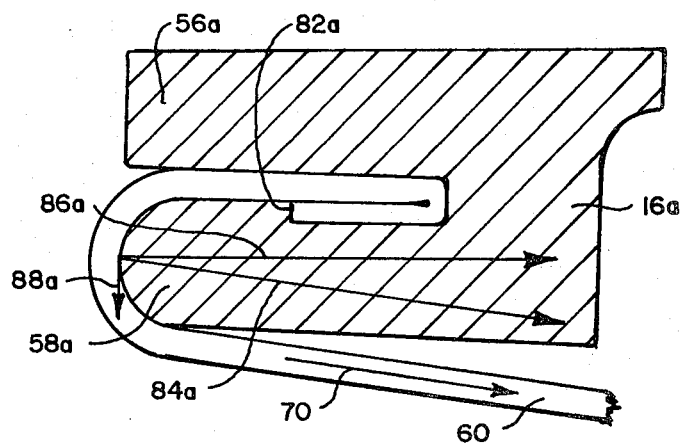

This phenomenon may be explained as follows: FIG. 4-A shows a resolution of forces brought to bear on the base 16 of applicants' invention as a result of the tension in the band 60 when the nuts 34 are tightened down, and FIG. 4-B shows a revolution of such forces on a similar base 16a but with the recess standing radially inwardly from the slot. This resolution of forces is shown and will be explained with reference to the base 16 of lug 12 but it will be understood that the same resolution of forces occurs in the base 14 of lug 10. The same numerals will be used to identify corresponding parts of the lugs of FIGS. 4-A and 4-B but the suffix "a" will be used to distinguish parts of FIG. 4-B from corresponding parts of FIG. 4-A.

Referring to FIG. 4-B essentially the entire tensile stress in band 60, represented by arrow 70, is absorbed by the lower jaw 58a through the abutment 82a and by virtue of the fact that the band is "wrapped" around the inner edge of the lower jaw; therefore, very little, if any, of the pull-out force of the band is absorbed by the upper jaw. The resultant force on the lower jaw as shown by arrow 84a acts in generally the same direction as the force of the stress in the band as shown by arrow 70. The force 84a may be resolved into a horizontal component 86a which produces a compression effort in the lower jaw and a vertical component 88a which produces a counterclockwise moment on the lower jaw 58a which tends to bend the lower jaw away from the upper jaw 56a. It should be understood at this point that due to the resilience of gasket 72, a certain amount of movement of the lower jaw is possible if the counterclockwise moment imposed on the lower jaw when the nuts are tightened is of sufficient magnitude. Thus in the arrangement shown in FIG. 4-B, virtually the entire tensile stress in the band 60 is converted into a moment on the lower jaw 58a.

Referring to FIG. 4-A, the tensile stress on the band 60 is the same as in FIG. 4-B and is again represented by the arrow 70. However, some of the force due to the stress in the band is now absorbed by the upper jaw 56 through abutment 82. The force imparted to the upper jaw by the band is depicted by arrow 90. Since some of the force produced by the band is absorbed by the upper jaw, there is less force left to impart a moment on the lower jaw 58. Thus the forces and stresses imposed on the lower jaw 58 for the same tensile stress in the band are considerably less than in the arrangement of FIG. 4-B and are depicted as relatively short arrows 84, 86 and 88. Therefore, for a given tensile stress in the band 60, the arrangement shown in FIG. 4-A produces a smaller bending moment on the lower jaw, which results in a substantially stronger band-to-lug connection than the arrangement shown in FIG. 4-B.

It is possible to realize the benefits of applicants' invention with a lug base in which the radial dimension of the recess extends both radially inward and radially outward from the slot. In other words, this recess would have abutments similar to both the abutment 82 of FIG. 4-A and the abutment 82a of FIG. 4-B. The main requirement is that there be an abutment similar to abutment 82 of FIG. 4-A so that some of the force due to the tensile stress in the band be transferred to the upper jaw of the lug base.

The invention herein described may be embodied in other specific forms without departing from the spirit or essential characteristics thereof. The present embodiment is therefore considered as illustrative and not restrictive, the scope of the invention being indicated by the appended claims and all departures from the foregoing description which come within the meaning and range of equivalency of the claims are therefore intended to be embraced therein.

We claim:

1. A pipe clamp comprised of a pair of lugs each of which has a base with an inner edge, an axially extending recess in each base forming opposed jaws in each base and opening to respective inner edges of each base, said recess being comprised of a first portion of essentially rectangular cross section and remote from said inner edges, and a second portion extending from said first portion to the said inner edges, the radial dimension of said first portion being larger than the radial dimension of said second portion and extending radially outward beyond the radial dimension of said second portion, a band having surface and edge portions and extending between said lugs, an intermediate portion at said band is of a radial dimension snugly received in said second portion of each recess, enlarged portions on the ends of said band comprised of multiple layers of band having surface portions in substantial area contact with each other, formed by the end portions of the band being folded back on the band whereby the surfaces of layers which are in contact with each other are continuations of each other, said enlarged portions and said band being axially insertable and snugly received in respectively the first and second portions of said recesses in each of said lugs.

2. The pipe clamp defined in claim 1 in which said layers are welded together.

3. The pipe clamp defined in claim 1 in which the radially inward surfaces of said first and second portions of said recesses are continuations of each other.

4. The pipe clamp defined in claim 3 in which said layers are welded together.

* * * * *